United States Patent
Tomioka (10) Patent No.: US 7,554,448 B2
(45) Date of Patent: Jun. 30, 2009

(54) RFID TRANSPONDER AND RFID TRANSPONDER CHIP

(75) Inventor: Takeshi Tomioka, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 407 days.

(21) Appl. No.: 11/599,339

(22) Filed: Nov. 15, 2006

(65) Prior Publication Data

US 2007/0057771 A1   Mar. 15, 2007

Related U.S. Application Data

(63) Continuation of application No. PCT/JP2004/009646, filed on Jul. 7, 2004.

(51) Int. Cl.
   *G08B 13/14* (2006.01)
(52) U.S. Cl. ............... 340/572.1; 340/505; 340/539.26; 340/539.27; 340/10.1; 340/636.15
(58) Field of Classification Search ............. 340/572.1, 340/539.26, 539.27, 10.1, 505, 636.1, 636.15, 340/660
   See application file for complete search history.

(56) References Cited

U.S. PATENT DOCUMENTS

| | | | | |
|---|---|---|---|---|
| 5,774,062 | A * | 6/1998 | Ikefuji | 340/10.4 |
| 6,791,457 | B2 * | 9/2004 | Shimura | 340/448 |
| 6,917,291 | B2 * | 7/2005 | Allen | 340/572.1 |
| 6,927,687 | B2 * | 8/2005 | Carrender | 340/539.26 |
| 7,053,777 | B2 * | 5/2006 | Allen | 340/572.1 |

FOREIGN PATENT DOCUMENTS

| | | |
|---|---|---|
| JP | 04-049484 A | 2/1992 |
| JP | 2000-258254 A | 9/2000 |
| JP | 2001-339776 A | 12/2001 |
| JP | 2003-016565 A | 1/2003 |
| JP | 2003-333950 A | 11/2003 |
| JP | 2004-024551 A | 1/2004 |

\* cited by examiner

*Primary Examiner*—Davetta W Goins
(74) *Attorney, Agent, or Firm*—Arent Fox LLP (57) ABSTRACT

A nonvolatile memory is accessed by a memory control circuit and stores temperature information indicating a temperature measured by a temperature sensor. A power supply control circuit supplies a first power supply voltage to the temperature sensor in response to a request for temperature measurement received via an antenna, and supplies a second power supply voltage to the nonvolatile memory and the memory control circuit after the temperature sensor measures the temperature. While the temperature sensor is measuring the temperature, the nonvolatile memory and the memory control circuit do not operate and thus do not generate heat. Therefore, the temperature sensor can accurately measure the temperature without being influenced from the heat generation caused by the operation of circuits in an RFID transponder.

20 Claims, 7 Drawing Sheets

RFID TRANSPONDER AND RFID TRANSPONDER CHIP

CROSS REFERENCE TO RELATED APPLICATION

This application is a continuation application of International Application PCT/JP2004/009646, filed Jul. 7, 2004, and designating the U.S.

BACKGROUND OF THE INVENTION

1. Field of the Invention

The present invention relates to an RFID transponder transmitting/receiving data by radio and an RFID transponder chip included in the RFID transponder.

2. Description of the Related Art

In recent years, an RFID transponder has been drawing attention as a key device for realizing a ubiquitous network. The use of RFID transponders in place of barcodes and the like for product identification eliminates the need to manually read barcodes and the like. The use of RFID transponders remarkably improves product management efficiency. RFID transponders are applicable not only to product identification but also to tracking of the history of products in manufacturing processes (production processes), the history of product management in distribution processes, and the like. Japanese Unexamined Patent Application Publication No. 2003-333950 discloses a method for managing the body temperature of farm animals by attaching RFID transponders to the farm animals. The RFID transponder of this type has an internal temperature sensor for measuring the body temperature of farm animals.

There is a demand for an RFID transponder chip included in an RFID transponder to achieve a sophisticated function, therefore, the integration scale of circuits of the RFID transponder chip is large. However, chip size has been on a decreasing trend in order to realize low-cost chips. Due to the downsizing of chips, temperature sensors mounted on RFID transponders have become more susceptible to heat generated by the operation of circuits in the RFID transponders. This has made it difficult to accurately measure the temperature of a measurement object to which an RFID transponder is attached.

SUMMARY OF THE INVENTION

It is an object of the present invention to accurately measure the temperature of an object to be measured to which an RFID transponder is attached.

According to one embodiment of the present invention, a data control circuit demodulates reception data received by an antenna and modulates transmission data to output the transmission data from the antenna. A nonvolatile memory is accessed by the memory control circuit and stores temperature information indicating a temperature measured by a temperature sensor. In response to a request for temperature measurement received via the antenna, a power supply control circuit supplies a first power supply voltage to the temperature sensor. The power supply control circuit supplies a second power supply voltage to the nonvolatile memory and the memory control circuit after the temperature sensor measures the temperature. That is, during a period in which the temperature sensor is measuring the temperature, the nonvolatile memory and the memory control circuit are not supplied with the second power supply voltage and thus do not operate. In this period, the nonvolatile memory and the memory control circuit do not generate heat. Therefore, the temperature sensor can accurately measure the temperature of the RFID transponder and its ambient temperature without being influenced by heat generation due to the operation of circuits in the RFID transponder.

In a preferable example of the embodiment of the present invention, the temperature sensor has a device, an A/D conversion circuit, and a memory circuit. The device has a first electrode through which a current whose value varies according to the temperature flows. Alternatively, a value of a voltage generated in the first electrode of the device varies according to the temperature. The A/D conversion circuit converts the current value or the voltage value to a digital value. The digital value resulting from the conversion is held in the memory circuit as the temperature information. The memory control circuit reads the temperature information held in the memory circuit to write the read temperature information to the nonvolatile memory. Since the temperature can be measured by utilizing the temperature characteristic of the device, it is possible to simplify the structure of the temperature sensor without using complicated manufacturing processes. As a result, reduction in cost of an RFID transponder and an RFID transponder chip can be achieved.

In a preferable example of the embodiment of the present invention, a rectifier circuit converts a radio wave received by the antenna to a direct-current voltage to supply the direct-current voltage resulting from the conversion as a main power supply voltage to the power supply control circuit. The power supply control circuit uses the main power supply voltage as the first and second power supply voltages. Therefore, the RFID transponder can operate and measure accurate temperature without having any battery or the like.

In a preferable example of the embodiment of the present invention, the power supply control circuit uses a main power supply voltage outputted from a battery as the first and second power supply voltages. The data control circuit operates when receiving the main power supply voltage. Since the RFID transponder incorporates a battery, the data control circuit is able to constantly receive the request for temperature measurement. It is not necessary to generate the main power supply voltage from the radio wave or the like received by the antenna, so that the RFID transponder can quickly measure the temperature of an object to be measured.

In a preferable example of the embodiment of the present invention, the data control circuit operates with the main power supply voltage. Therefore, the data control circuit starts its operation to be able to receive the request for temperature measurement immediately after the main power supply voltage is generated by the rectifier circuit.

In a preferable example of the embodiment of the present invention, a distance between the temperature sensor and the data control circuit is longer than a distance between the temperature sensor and at least one of the memory control circuit and the nonvolatile memory. For example, at least one of the memory control circuit and the nonvolatile memory is disposed between the temperature sensor and the data control circuit. Alternatively, a distance between the temperature sensor and the power supply control circuit is longer than a distance between the temperature sensor and at least one of the memory control circuit and the nonvolatile memory. For example, at least one of the memory control circuit and the nonvolatile memory is disposed between the temperature sensor and the power supply control circuit. This can prevent the temperature sensor from being influenced by heat generated from the data control circuit and the power supply control circuit. As a result, the temperature of the RFID transponder and its ambient temperature can be accurately measured.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be described by using the drawings. Each double circle in the drawings represents an external terminal. In the drawings, each power supply line is shown by a heavy line.

Figure 1:
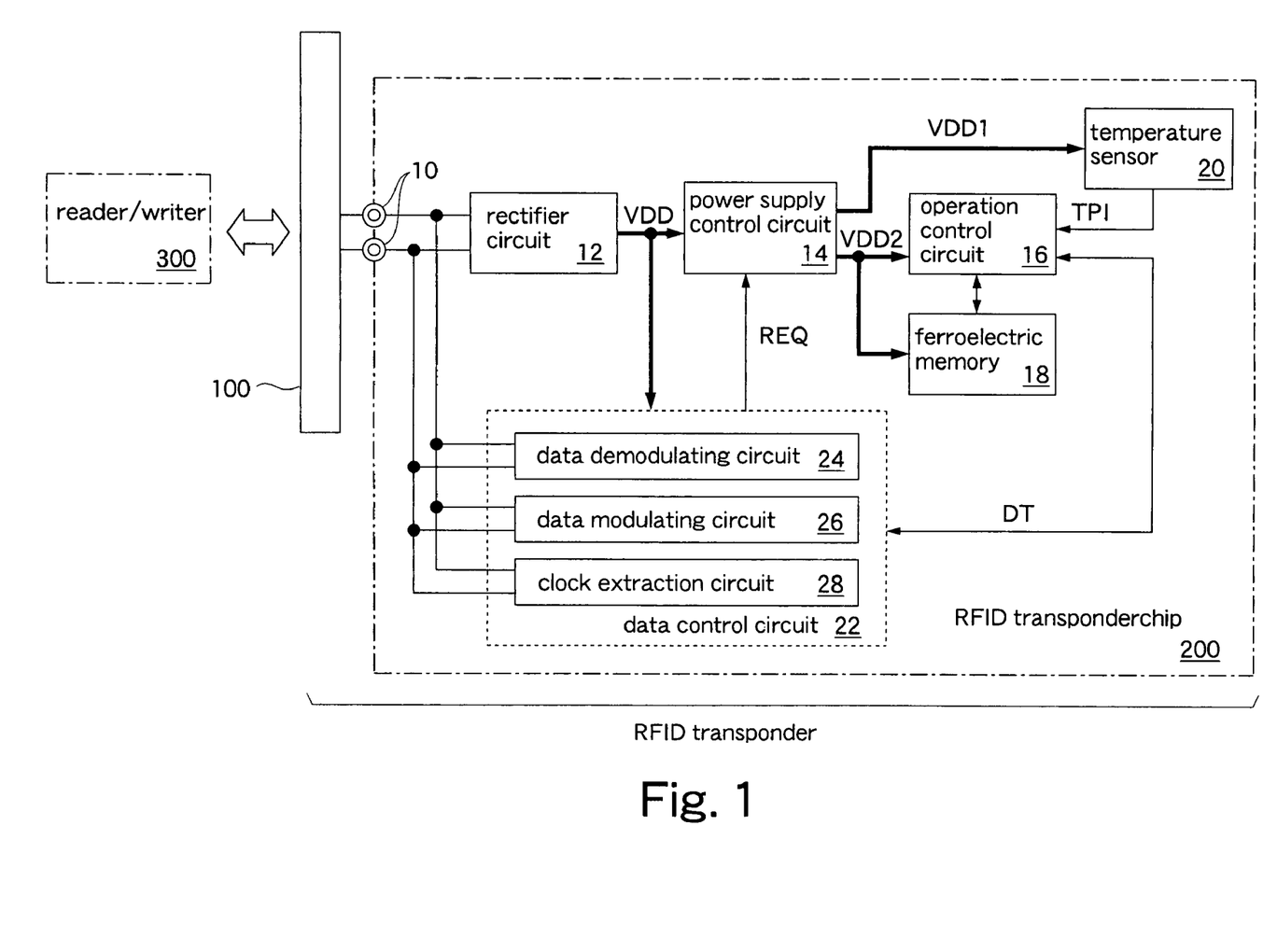
FIG. 1 is a block diagram showing a first embodiment of an RFID transponder and an RFID transponder chip of the present invention.

FIG. 1 shows a first embodiment of an RFID transponder and an RFID transponder chip of the present invention. The RFID transponder includes a dipole antenna 100, an RFID transponder chip 200, and a resin board (not shown) on which the RFID transponder chip 200 is mounted. The dipole antenna 100 is formed of a metal leaf printed on the resin board. The RFID transponder chip 200 is formed on a silicon substrate by using a CMOS process. A thickness of the RFID transponder chip 200 is set to 100 μm by polishing a rear surface of a silicon wafer. In this embodiment, the thickness of the chip is set to 100 μm, but further reducing the thickness of the chip results in a larger heat-resistance in a direction along a front surface of the silicon substrate. Consequently, the transmission of heat, which is generated by the operation of a circuit, to another circuit via the silicon substrate can be reduced to a minimum.

The RFID transponder is attached to, for example, a perishable food (vegetable, meat, milk, or the like) before the shipment of the perishable food. Then, temperatures of the perishable food measured in distribution processes after the shipment are sequentially stored in the RFID transponder. The temperature is measured on a bed of a truck transporting the perishable food, in a warehouse storing the perishable food, in a showcase in a shop, and so on. The temperature measurement is conducted in response to a temperature measuring request transmitted by radio from readers/writers 300. The readers/writers 300 are installed in the bed of the truck, the warehouse, the showcase, and so on where the temperature measurement is conducted. For communication between the readers/writers 300 and the RFID transponder, a carrier frequency of, for example, 950-956 MHz (UHF band) is used, and its communication range is 1-5 m. The readers/writers 300 transmit power and data to the RFID transponder.

The RFID transponder chip 200 has antenna terminals 10 to which the dipole antenna 100 is connectable, a rectifier circuit 12, a power supply control circuit 14, an operation control circuit 16, a ferroelectric memory (nonvolatile memory) 18, a temperature sensor 20, and a data control circuit 22.

The rectifier circuit 12 rectifies an alternating radio (alternating current) received by the dipole antenna 100 to generate a direct-current voltage. Charges generated by the rectification are accumulated in a smoothing capacitor not shown. The smoothing capacitor smoothes the rectified voltage, so that a stable main power supply voltage VDD is generated in a power supply line.

The power supply control circuit 14 is capable of operating while receiving the main power supply voltage VDD supplied from the rectifier circuit 12. The power supply control circuit 14 sequentially outputs the main power supply voltage VDD as a first power supply voltage VDD1 and a second power supply voltage VDD2 in response to the temperature measuring requests which are received from the readers/writers 300 via the data control circuit 22. The power supply control circuit 14 has a function of keeping values of the first power supply voltage VDD1 and the second power supply voltage VDD2 constant irrespective of temperature.

The operation control circuit 16 controls the operation of the whole RFID transponder. The operation control circuit 16 also operates as a memory control circuit accessing the ferroelectric memory 18 (executing a write operation and a read operation). The operation control circuit 16 is capable of operating while receiving the second power supply voltage VDD2.

The ferroelectric memory 18 has a unique ID (UID) area to which a unique ID is written in a semiconductor fabrication plant, and in addition, has a unique area to which unique information on a product to which the RFID transponder is attached (for example, place of production, producer's name, shipment date, and the like in a case of food), and a temperature management area to which temperatures of the food are written, the temperature being measured, for instance, every 10 minutes in the distribution processes. The ferroelectric memory 18 is capable of operating while receiving the second power supply voltage VDD2. The data written to the ferroelectric memory 18 are read by the readers/writers 300.

When supplied with the first power supply voltage VDD1, the temperature sensor 20 starts its operation to measure the temperature of the RFID transponder. Temperature information TP1 indicating the temperature of the RFID transponder is written to the ferroelectric memory 18 via the operation control circuit 16.

The data control circuit 22 has a data demodulating circuit 24, a data modulating circuit 26, and a clock extraction circuit 28. The data demodulating circuit 24 demodulates data received via the dipole antenna 100 to output data DT resulting from the demodulation to the operation control circuit 16. The data supplied to the RFID transponder include the unique information on the food and the temperature measuring request. The data modulating circuit 26 modulates data DT supplied from the operation control circuit 16. Data resulting from the modulation is outputted to the readers/writers 300 via the dipole antenna 100. The clock extraction circuit 28 extracts clocks from a radio wave received by the dipole antenna 100 to output the extracted clocks to the operation control circuit 16.

Here, the operation control circuit 16 and the ferroelectric memory 18 are disposed between the temperature sensor 20 and the data control circuit 22/the power supply control circuit 14. That is, distances from the temperature sensor 20 to the data control circuit 22 and to the power supply control circuit 14 are longer than distances from the temperature sensor 20 to the operation control circuit 16 and to the ferroelectric memory 18. Specifically, the data control circuit 22 and the power supply control circuit 14 are apart from the temperature sensor 20 by 50 μm or more.

The data control circuit 22 and the power supply control circuit 14 are circuits necessary to receive the temperature measuring requests and need to operate before the temperature sensor 20 starts its operation. Since the circuits operated prior to the operation of the temperature sensor 20 are installed apart from the temperature sensor 20 on the RFID transponder chip 200, it is possible to prevent the temperature sensor 20 from being influenced by heat generated from the data control circuit 22 and the power supply control circuit 14. Further, as described above, reducing the thickness of the silicon substrate allows the temperature sensor 20 to be less susceptible to the influence of the heat generated from the data control circuit 22 and the temperature control circuit 14. As a result, the temperature of a product such as food can be accurately measured.

Figure 2:
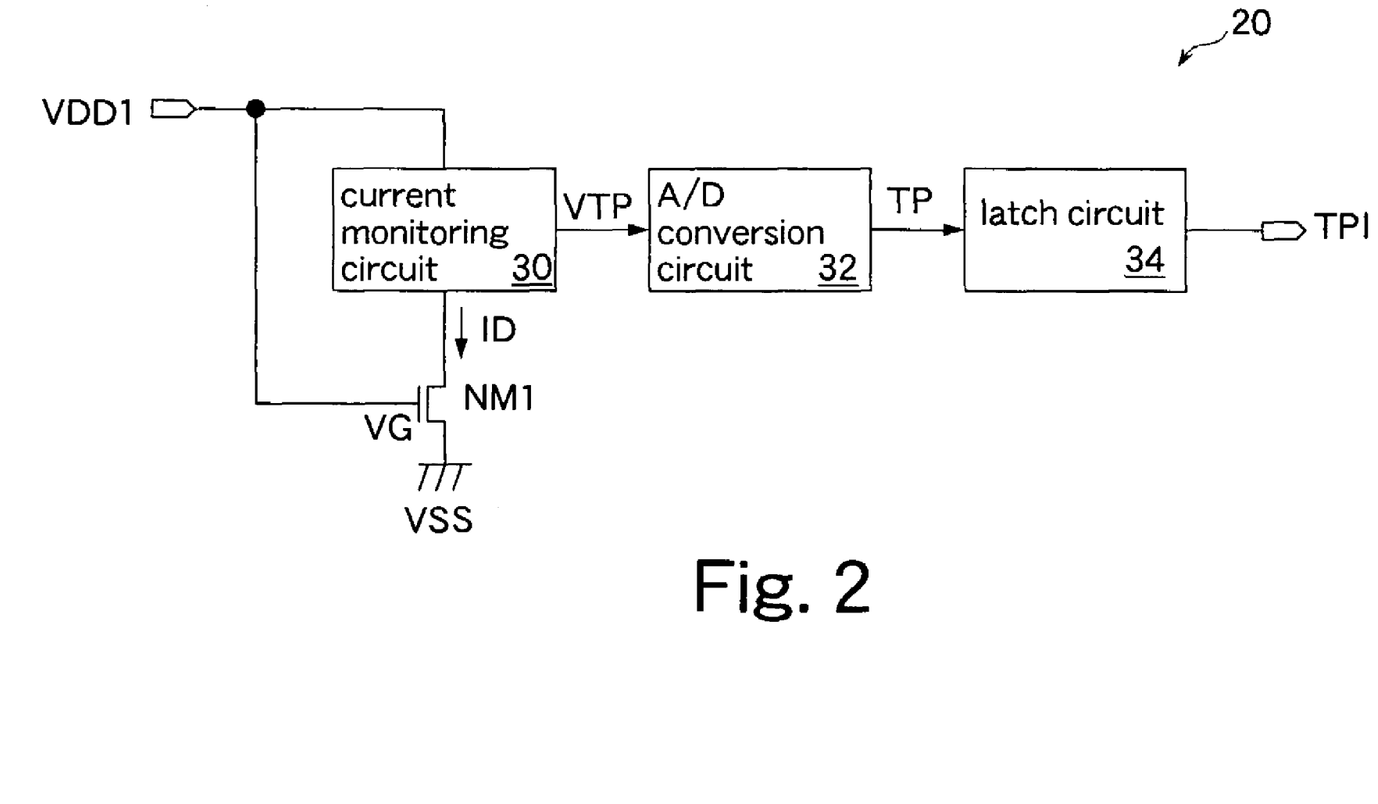
FIG. 2 is a block diagram showing details of a temperature sensor shown in FIG. 1.

FIG. 2 shows details of the temperature sensor 20 shown in FIG. 1. The temperature sensor 20 has a current monitoring circuit 30, an A/D conversion circuit 32, a latch circuit 34 (memory circuit), and an nMOS transistor NM1.

A drain and a gate of the nMOS transistor NM1 are connected to a first power supply voltage line VDD1 via the current monitoring circuit 30. A source of the nMOS transistor NM1 is connected to a ground line VSS. A gate voltage VG of the nMOS transistor NM1 is equal to the first power supply voltage VDD1 and is constant irrespective of the temperature. Therefore, a gate-source voltage of the nMOS transistor NM1 is constant. On the other hand, a drain current ID flowing through the drain (first electrode) of the nMOS transistor NM1 increases as the temperature increases and decreases as the temperature decreases. Thus, the temperature sensor 20 can be easily realized by using an ordinary CMOS process.

The current monitoring circuit 30 converts the drain current ID to a voltage value VTP and outputs the voltage value VTP resulting from the conversion to the A/D conversion circuit 32. The A/D conversion circuit 32 converts the voltage value VTP to a digital value TP and outputs the digital value TP resulting from the conversion to the latch circuit 34. That is, the A/D conversion circuit 32 converts the drain current ID, which varies depending on the temperature of the RFID transponder, to the digital value TP. The latch circuit 34 holds the digital value TP as the temperature information TP1 indicating the temperature of the RFID transponder and outputs the held temperature information TP1 to the operation control circuit 16 shown in FIG. 1.

Figure 3:
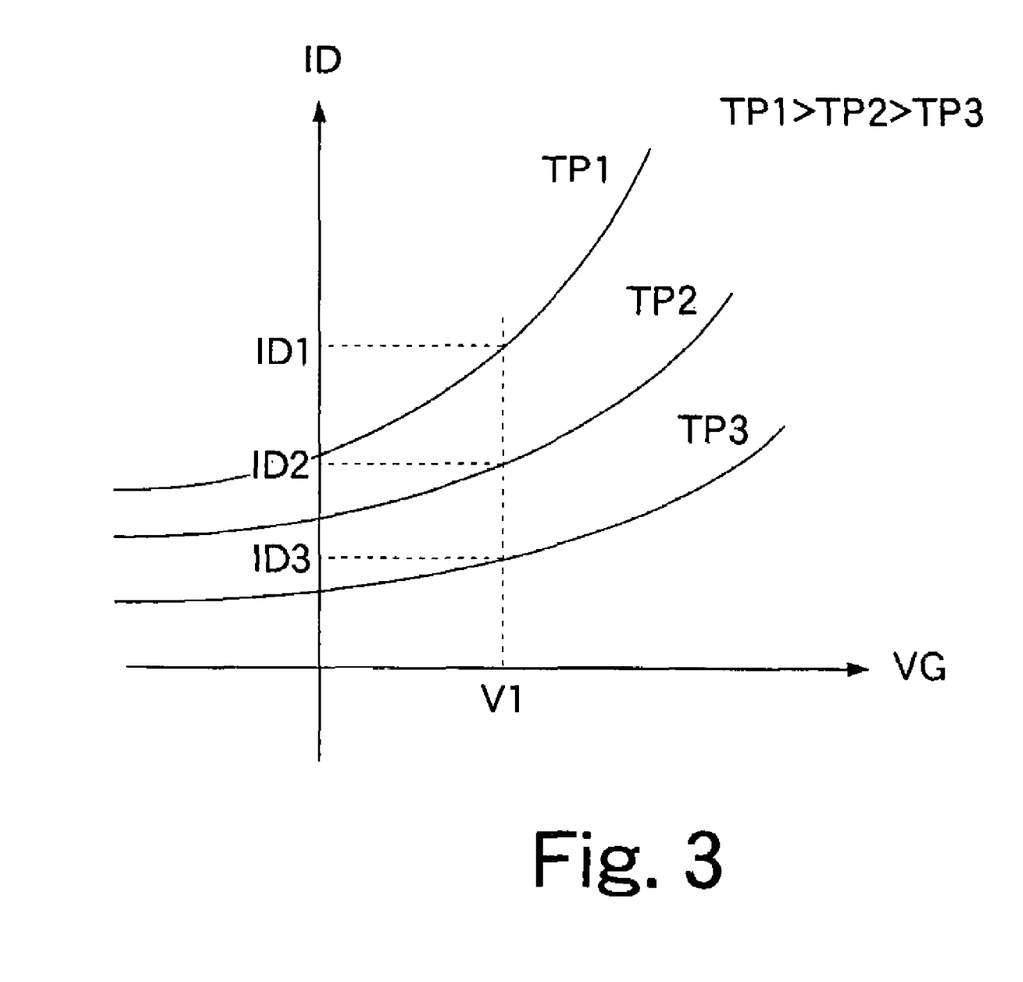
FIG. 3 is a characteristic chart showing temperature dependency of a drain current flowing through an nMOS transistor shown in FIG. 2.

FIG. 3 shows temperature dependency of the drain current ID flowing through the nMOS transistor NM1 shown in FIG. 2. The drain current ID (ID1, ID2, ID3) has a characteristic that it increases as the temperature (TP1, TP2, TP3) gets higher when the gate voltage VG (gate-source voltage) is constant (VG=V1). Therefore, by utilizing the temperature characteristic of the drain current ID, it is possible to indirectly measure the temperature of the RFID transponder and its ambient temperature. The RFID transponder is attached individually to each food, which enables separate temperature control of each food. Therefore, it is possible to accurately measure the temperature of the food depending on, for example, the position in a bed of a truck. Specifically, accurate temperature measurement is always possible even though the temperature of a position near a roof and a position near an engine tends to become high. Similarly, even when a cold storage function of a showcase where foods are displayed is temporarily stopped, the temperature of food directly in contact with an open air and the temperature of food put in a deeper place of the showcase can be individually measured.

Figure 4:
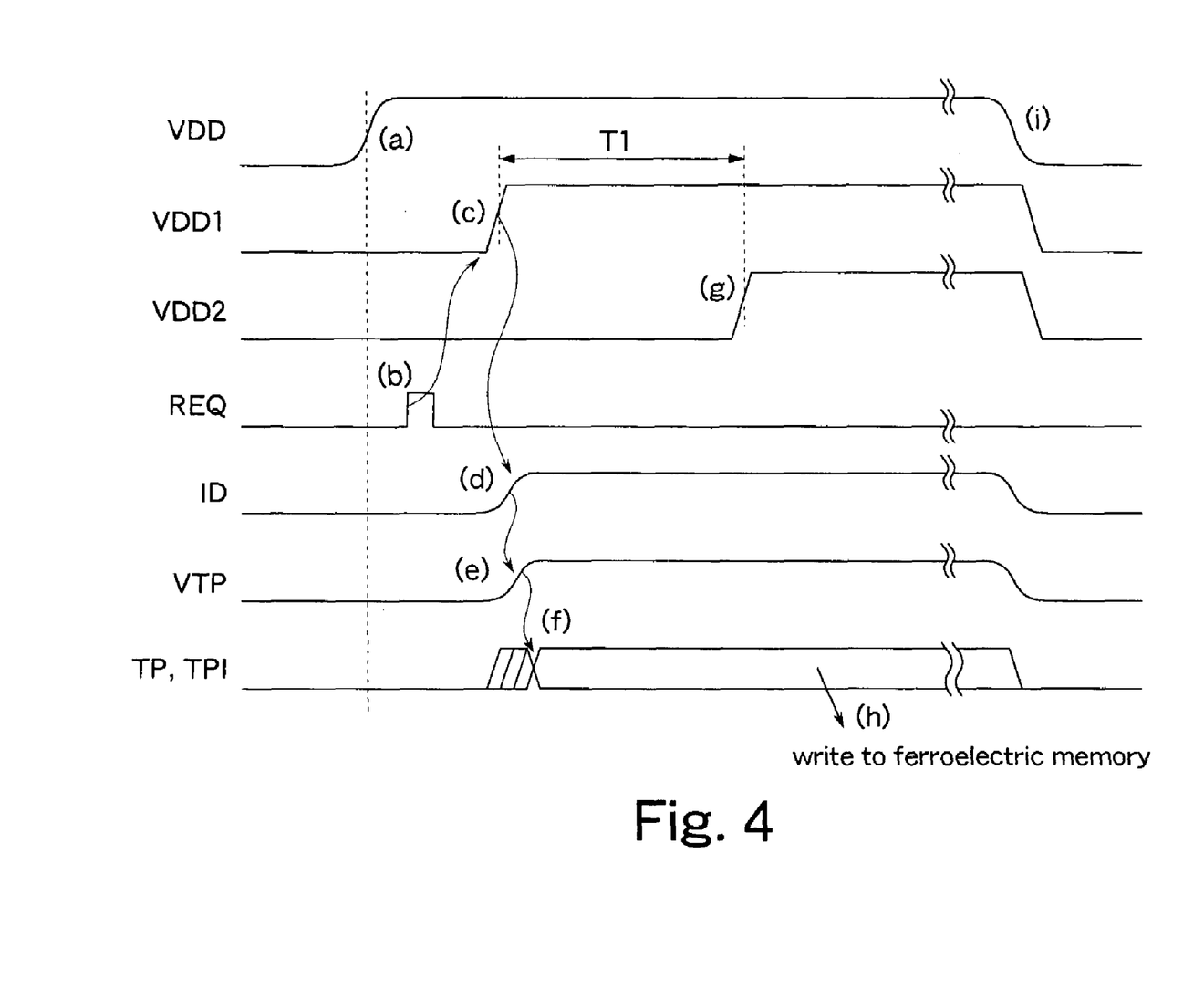
FIG. 4 is a timing chart showing the operations of the RFID transponder of the first embodiment.

FIG. 4 shows the operations of the RFID transponder of the first embodiment. The operations shown in FIG. 4 are executed when, for example, the reader/writer 300 installed in the bed of the truck transmits power and the temperature measurement request to each of the RFID transponders every ten minutes. The readers/writers 300 in the warehouse and the showcase also transmit power and the temperature measuring requests to the RFID transponder at the same intervals.

First, the rectifier circuit 12 of the RFID transponder receives a radio wave (power) from the reader/writer 300 to generate the main power supply voltage VDD (FIG. 4(a)). The power supply control circuit 14 and the data control circuit 22 are activated upon receiving the main power supply voltage VDD to become operable. The data control circuit 22 outputs a request signal REQ to the power supply control circuit 14 in response to the temperature measurement request from the reader/writer 300 (FIG. 4(b)).

In response to the request signal REQ, the power supply control circuit 14 starts outputting the first power supply voltage VDD1 (=VDD) (FIG. 4(c)). The nMOS transistor NM1 of the temperature sensor 20 shown in FIG. 2 receives the first power supply voltage VDD1 at its drain and gate to generate the drain current ID corresponding to the temperature of the RFID transponder (FIG. 4(d)). The current monitoring circuit 30 converts the drain current ID to the voltage VTP (FIG. 4(e)). The A/D conversion circuit 32 converts the voltage value VTP to the digital value TP. The latch circuit 34 latches the digital value TP to output the latched value as the temperature information TP1 (FIG. 4(f)).

The power supply control circuit 14 starts outputting the second power supply voltage VDD2 (=VD) after a time T1 elapses from the generation of the first power supply voltage VDD1 (FIG. 4(g)). The time T1 is set to a time longer than a period from the receipt of the first power supply voltage VDD1 to the output of the temperature information TP1 by the temperature sensor 20. The operation control circuit 16 shown in FIG. 1 writes the temperature information TP1 received from the temperature sensor 20 to the ferroelectric memory 18 (FIG. 4(h)). The temperature information TP1 is sequentially written to the ferroelectric memory 18 every time the temperature measuring request is issued.

Thereafter, the RFID transponder transmits/receives necessary data to/from the reader/writer 300 and accesses the ferroelectric memory 18. The necessary data here are the time at which the temperature measuring request is issued, a place where the temperature is measured, and so on. Then, the reader/writer 300 finishes the transmission of the power. In accordance with the end of the power transmission, the rectifier circuit 12 stops outputting the main power supply voltage VDD (FIG. 4(i)). In accordance with the stop of the power supply voltage VDD, the RFID transponder stops its operation.

In this embodiment described above, the temperature sensor 20 is operated to measure the temperature before the second power supply voltage VDD2 is supplied to the operation control circuit 16 and the ferroelectric memory 18. This allows the temperature sensor 20 to accurately measure the temperature of the perishable food without influenced by heat generation caused by the operation of the operation control circuit 16 and the ferroelectric memory 18.

Since the temperature dependency of the drain current ID of the nMOS transistor NM1 is utilized to measure the temperature, it is possible to simply configure the temperature sensor 20 only through the conventional CMOS process without using complicated fabrication processes. As a result, cost reduction of the RFID transponder and the RFID transponder chip can be realized.

Since the rectifier circuit 12 is used to convert the radio wave (power), which is received by the dipole antenna 100, to the main power supply voltage VDD, the RFID transponder can operate and accurately measure the temperature without having any battery or the like.

Being supplied with the main power supply voltage VDD, the data control circuit 22 can start its operation and receive the temperature measuring request immediately after the rectifier circuit 12 generates the main power supply voltage VDD.

Since the temperature sensor 20 is disposed apart from the power supply control circuit 14 and the data control circuit 22 which operate by receiving the main power supply voltage VDD, it is possible to prevent the temperature sensor 20 from being influenced by heat generated from the power supply control circuit 14 and the data control circuit 22. As a result, accurate measurement of the temperature of the perishable food is possible.

Figure 5:
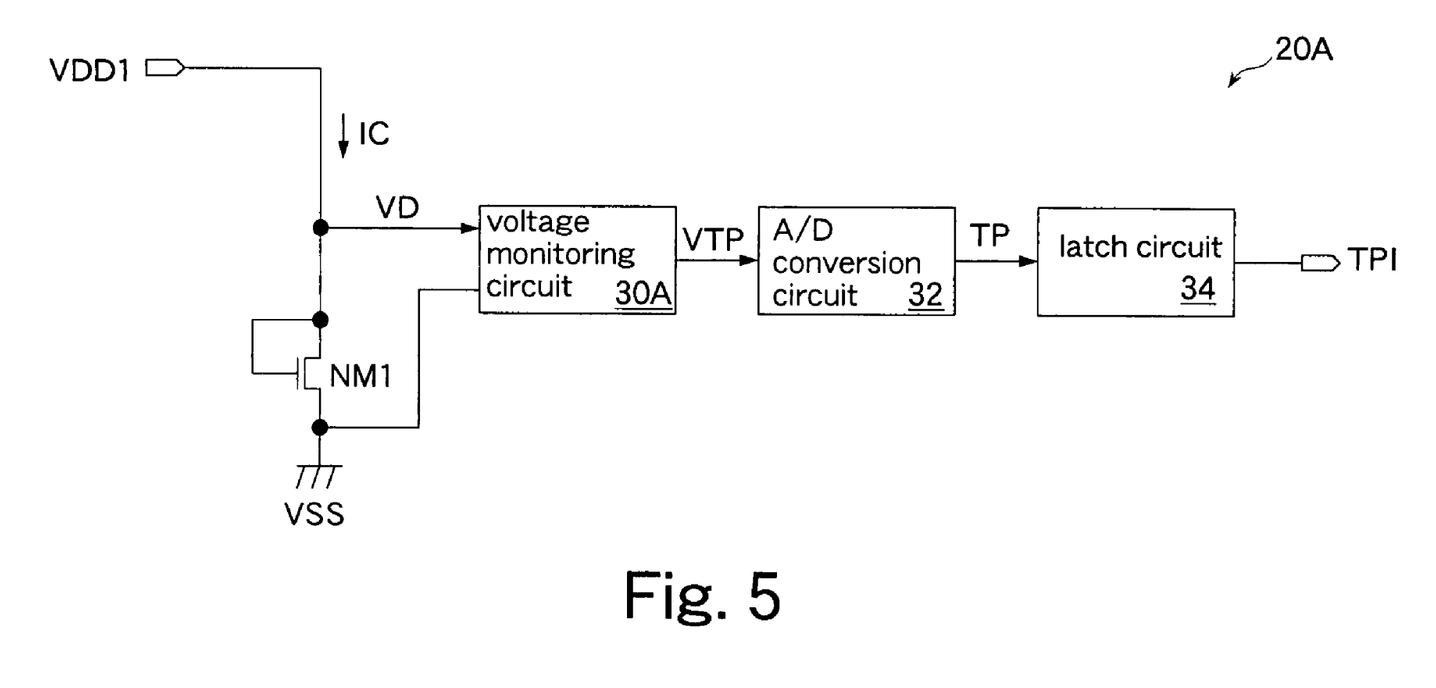
FIG. 5 is a block diagram showing an essential part of a second embodiment of the RFID transponder and the RFID transponder chip of the present invention.

FIG. 5 shows an essential part of a second embodiment of the RFID transponder and the RFID transponder chip of the present invention. The same reference numerals and symbols are used to designate the same elements as the elements described in the first embodiment, and detailed description thereof will be omitted.

An RFID transponder chip of this embodiment has a temperature sensor 20A instead of the temperature sensor 20 of the first embodiment. The other configuration is the same as that of the RFID transponder and the RFID transponder chip of the first embodiment. That is, the RFID transponder includes a dipole antenna 100 shown in FIG. 1, an RFID transponder chip, and a resin board (not shown) on which these components are mounted. The RFID transponder chip has antenna terminals 10, a rectifier circuit 12, a power supply control circuit 14, an operation control circuit 16, a ferroelectric memory 18, the temperature sensor 20A, and a data control circuit 22.

As in the first embodiment, the RFID transponder is attached to, for example, a perishable food (vegetable, meat, milk, or the like) before the shipment of the perishable food. Then, the temperatures of the perishable food measured in distribution processes after the shipment are sequentially stored in the RFID transponder.

The temperature sensor 20A has a voltage monitoring circuit 30A instead of the current monitoring circuit 30 of the first embodiment. The other configuration of the temperature sensor 20A is the same as that of the temperature sensor 20 of the first embodiment. That is, the temperature sensor 20A has an nMOS transistor NM1, the voltage monitoring circuit 30A, an A/D conversion circuit 32, and a latch circuit 34.

A source of the nMOS transistor NM1 is connected to a ground line VSS. A drain and a gate of the nMOS transistor NM1 are connected to a first power supply voltage line VDD1. That is, the nMOS transistor NM1 operates as a diode. In this embodiment, the rectifier circuit 12 outputting a main power supply voltage VDD operates also as a constant-current source. Since a constant current IC is supplied to the nMOS transistor NM1, a drain voltage VD (drain-source voltage) of the nMOS transistor NM1 varies depending on temperature.

The voltage monitoring circuit 30A converts the drain voltage VD to a voltage value VTP and outputs the voltage value VTP resulting from the conversion to the A/D conversion circuit 32. The A/D conversion circuit 32 converts the voltage value VTP to a digital value TP and outputs the digital value TP resulting from the conversion to the latch circuit 34. The latch circuit 34 holds the digital value TP as temperature information TP1 indicating the temperature of the RFID transponder and outputs the held temperature information TP1 to the operation control circuit 16 shown in FIG. 1.

This embodiment can also provide the same effects as those of the above-described first embodiment.

Figure 6:
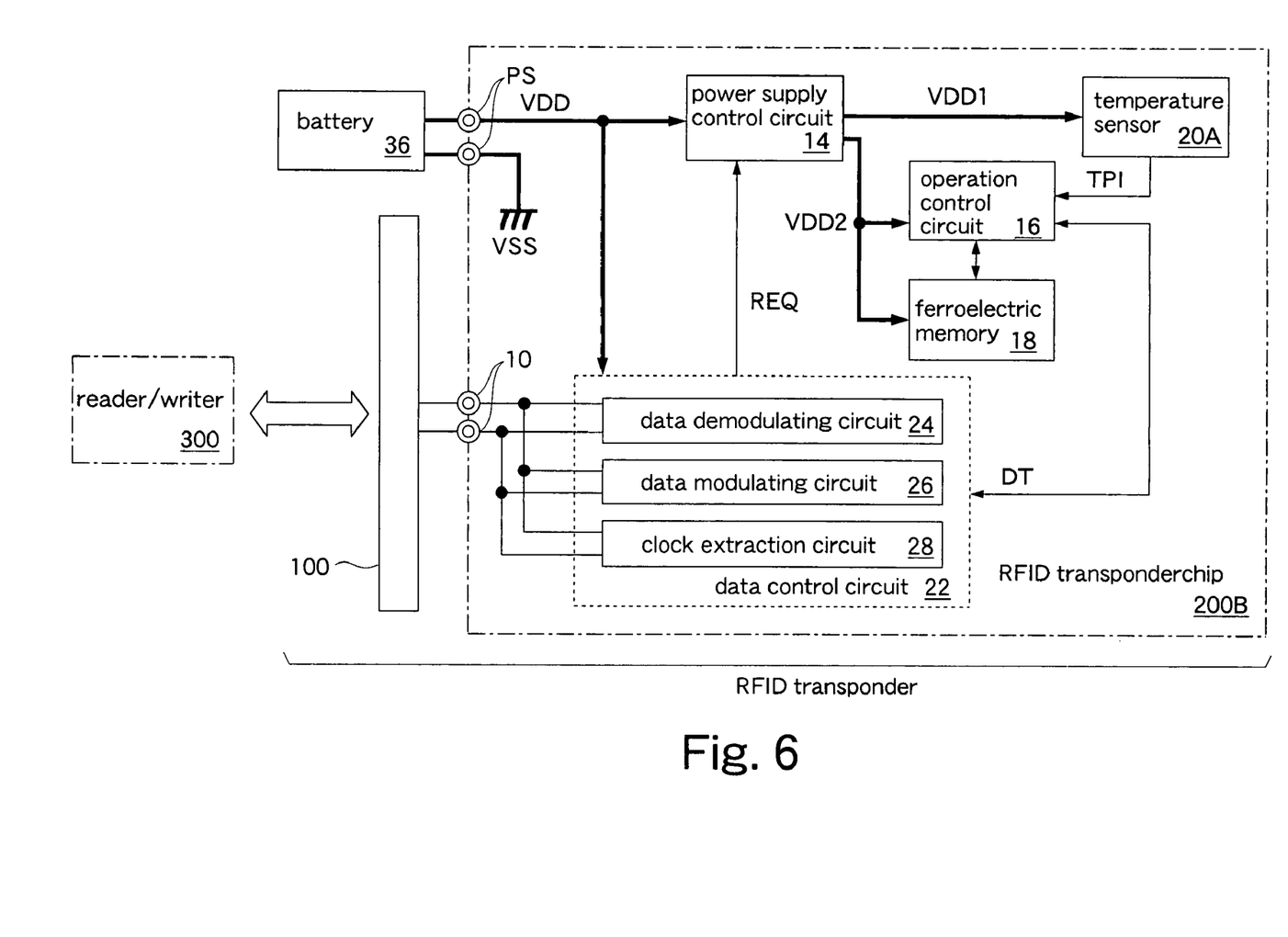
FIG. 6 is a block diagram showing a third embodiment of the RFID transponder and the RFID transponder chip of the present invention.

FIG. 6 shows a third embodiment of the RFID transponder and the RFID transponder chip of the present invention. The same reference numerals and symbols are used to designate the same elements as the elements described in the first embodiment, and detailed description thereof will be omitted.

The RFID transponder of this embodiment has a battery 36 in addition to a dipole antenna 100 and an RFID transponder chip 200B. The RFID transponder chip 200B has the structure of the first embodiment without the rectifier circuit 12. The other configuration is the same as that of the RFID transponder and the RFID transponder chip of the first embodiment. That is, the RFID transponder chip 200B has antenna terminals 10, a power supply control circuit 14, an operation control circuit 16, a ferroelectric memory 18, a temperature sensor 20A, and a data control circuit 22.

As in the first embodiment, the RFID transponder is attached to, for example, a perishable food (vegetable, meat, milk, or the like) before the shipment of the perishable food. Then, the temperatures of the perishable food measured in distribution processes after the shipment are sequentially stored in the RFID transponder.

The power supply control circuit 14 and the data control circuit 22 receive a main power supply voltage VDD from the battery 36 via a power supply terminal PS. Therefore, the power supply control circuit 14 and the data control circuit 22 constantly operate without receiving a radio wave from readers/writers 300 as power supply sources.

Figure 7:
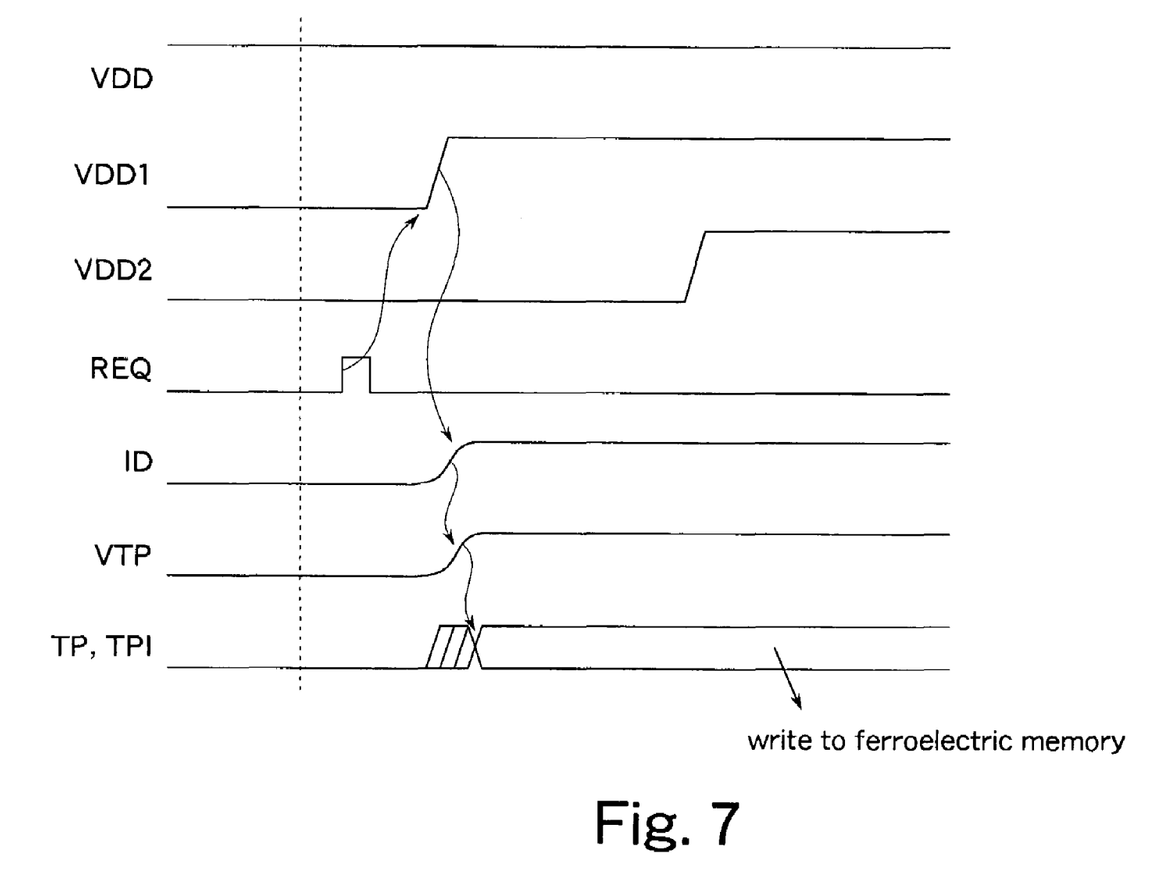
FIG. 7 is a timing chart showing the operations of the RFID transponder of the third embodiment.

FIG. 7 shows the operations of the RFID transponder of the third embodiment. Detailed description of the same operations as the above-described operations in FIG. 4 will be omitted. The operations shown in FIG. 7 are executed when, for example, the reader/writer 300 installed in a bed of a truck transmits power and a temperature measuring request to each of the RFID transponders every 10 minutes. The readers/writers 300 in a warehouse and a showcase also transmit power and the temperature measuring requests to the RFID transponder at the same intervals.

In this embodiment, the main power supply voltage VDD is constantly supplied to the RFID transponder chip 200B. Therefore, the data control circuit 22 is capable of constantly operating, and in response to the temperature measuring request from the reader/writer 300, it outputs a request signal REQ to the power supply control circuit 14. In response to the request signal REQ, the power supply control circuit 14 starts outputting a first power supply voltage VDD1 (=VDD). Thereafter, the same operations as those in FIG. 4 are executed, so that temperature information TP1 indicating the temperature of the food is written to the ferroelectric memory 18. The temperature information TP1 is sequentially written to the ferroelectric memory 18 every time the temperature measuring request is issued. Thereafter, the RFID transponder transmits/receives necessary data to/from the reader/writer 300 and accesses the ferroelectric memory 18.

This embodiment can also provide the same effects as those of the above-described first embodiment. In addition, in this embodiment, the RFID transponder has the internal battery 36, and the main power supply voltage VDD outputted from the battery 36 is used as the first and second power supply voltages VDD1, VDD2. Therefore, the data control circuit 22 is capable of constantly receiving the temperature measuring request. Since it is not necessary to generate the main power supply voltage VDD from a radio wave or the like received by the antenna, the RFID transponder is capable of quickly measuring the temperature of the perishable food.

The above embodiments have described the examples where the current-voltage characteristic of the nMOS transistor NM1 depending on temperature change is utilized and the nMOS transistor NM1 functions as a thermometer. The present invention is not limited to such embodiments. For example, metal, amorphous such as tungsten silicon nitride, or a ferroelectric material such as PZT whose resistance value (current-voltage characteristic) varies depending on temperature, or a diode using a PN junction may be used to form the temperature sensor. Having already been in general use in manufacture of semiconductors, the materials and devices of these kinds can be easily incorporated in the RFID transponder chip without adding any new fabrication process.

The above first embodiment has described the example where the constant voltage VG is supplied to the gate-source of the nMOS transistor NM1 and the temperature is measured based on the drain current ID that varies depending on temperature. The present invention is not limited to such an embodiment. Another possible example is to supply a constant current to the drain of the nMOS transistor NM1 and measure the temperature based on a gate voltage that varies depending on temperature.

The above second embodiment has described the example where the constant current IC is supplied to the drain of the nMOS transistor NM1 and the temperature is measured based on the drain voltage VD that varies depending on temperature. The present invention is not limited to such an embodiment. Another possible example is to supply a constant voltage to the drain-source of the nMOS transistor NM1 and measure the temperature based on a drain current that varies depending on temperature.

The above embodiments have described the examples where the carrier frequency of 950-956 MHz is used for communication with the readers/writers 300 and the RFID transponder. The present invention is not limited to such embodiments. For example, a carrier frequency of 13.56 MHz (electromagnetic field) may be used for communication between the readers/writers 300 and the RFID transponder. In this case, instead of the dipole antenna 100, a coil antenna is mounted on the RFID transponder.

The above embodiments have described the examples where the RFID transponder has the dipole antenna 100. The present invention is not limited to such embodiments. For example, a patch antenna may be mounted on the RFID transponder.

The above embodiments have described the examples where the RFID transponder is attached to a perishable food to control the temperature of the perishable food. The present invention is not limited to such embodiments. The RFID transponder may be attached not only to the perishable food but also to products requiring temperature control.

The invention is not limited to the above embodiments and various modifications may be made without departing from the spirit and scope of the invention. Any improvement may be made in part or all of the components.

What is claimed is:

1. An RFID transponder comprising:
  an antenna;
  a data control circuit that demodulates reception data received by said antenna and modulates transmission data in order to output the transmission data from said antenna;
  a temperature sensor;
  a nonvolatile memory that stores temperature information indicating a temperature measured by said temperature sensor;
  a memory control circuit that accesses said nonvolatile memory; and
  a power supply control circuit that supplies a first power supply voltage to said temperature sensor in response to a request for temperature measurement received via said antenna, and supplies a second power supply voltage to said nonvolatile memory and said memory control circuit after said temperature sensor measures the temperature.

2. The RFID transponder according to claim 1, wherein:
  said temperature sensor comprises:
  a device having a first electrode through which a current whose value varies according to the temperature flows;
  an A/D conversion circuit converting the current value to a digital value; and
  a memory circuit holding the digital value resulting from the conversion as the temperature information; and
  said memory control circuit reads the temperature information held in said memory circuit to write the read temperature information to said nonvolatile memory.

3. The RFID transponder according to claim 1, wherein:
  said temperature sensor comprises:
  a device having a first electrode in which a voltage whose value varies according to the temperature is generated;
  an A/D conversion circuit converting the voltage value to a digital value; and
  a memory circuit holding the digital value resulting from the conversion as the temperature information; and
  said memory control circuit reads the temperature information held in said memory circuit to write the read temperature information to said nonvolatile memory.

4. The RFID transponder according to claim 1, further comprising
  a rectifier circuit that converts a radio wave received by said antenna to a direct-current voltage and supplies the direct-current voltage resulting from the conversion as a main power supply voltage to said power supply control circuit, and wherein
  said power supply control circuit uses said main power supply voltage as the first and second power supply voltages.

5. The RFID transponder according to claim 4, wherein said data control circuit operates when receiving said main power supply voltage.

6. The RFID transponder according to claim 1, further comprising
  a battery outputting a main power supply voltage, and wherein:
  said power supply control circuit uses said main power supply voltage as the first and second power supply voltages; and
  said data control circuit operates when receiving said main power supply voltage.

7. The RFID transponder according to claim 1, wherein a distance between said temperature sensor and said data control circuit is longer than a distance between said temperature sensor and at least one of said memory control circuit and said nonvolatile memory.

8. The RFID transponder according to claim 7, wherein at least one of said memory control circuit and said nonvolatile memory is disposed between said temperature sensor and said data control circuit.

9. The RFID transponder according to claim 1, wherein
a distance between said temperature sensor and said power supply control circuit is longer than a distance between said temperature sensor and at least one of said memory control circuit and said nonvolatile memory.

10. The RFID transponder according to claim 9, wherein
at least one of said memory control circuit and said nonvolatile memory is disposed between said temperature sensor and said power supply control circuit.

11. An RFID transponder chip comprising:
a data control circuit that demodulates reception data received by an external antenna and modulates transmission data in order to output the transmission data from said antenna;
a temperature sensor;
a nonvolatile memory that stores temperature information indicating a temperature measured by said temperature sensor;
a memory control circuit that accesses said nonvolatile memory; and
a power supply control circuit that supplies a first power supply voltage to said temperature sensor in response to a request for temperature measurement received via said antenna, and supplies a second power supply voltage to said nonvolatile memory and said memory control circuit after said temperature sensor measures the temperature.

12. The RFID transponder chip according to claim 11, wherein:
said temperature sensor comprises:
a device having a first electrode through which a current whose value varies according to the temperature flows;
an A/D conversion circuit converting the current value to a digital value; and
a memory circuit holding the digital value resulting from the conversion as the temperature information; and
said memory control circuit reads the temperature information held in said memory circuit to write the read temperature information to said nonvolatile memory.

13. The RFID transponder chip according to claim 11, wherein:
said temperature sensor comprises:
a device having a first electrode in which a voltage whose value varies according to the temperature is generated;
an A/D conversion circuit converting the voltage value to a digital value; and
a memory circuit holding the digital value resulting from the conversion as the temperature information; and
said memory control circuit reads the temperature information held in said memory circuit to write the read temperature information to said nonvolatile memory.

14. The RFID transponder chip according to claim 11, further comprising
a rectifier circuit that converts a radio wave received by said antenna to a direct-current voltage and supplies the direct-current voltage resulting from the conversion as a main power supply voltage to said power supply control circuit, and wherein
said power supply control circuit uses said main power supply voltage as the first and second power supply voltages.

15. The RFID transponder chip according to claim 14, wherein
said data control circuit operates when receiving said main power supply voltage.

16. The RFID transponder chip according to claim 11, further comprising
a power supply terminal to which an external battery outputting a main power supply voltage is connectable, and wherein:
said power supply control circuit uses said main power supply voltage as the first and second power supply voltages; and
said data control circuit operates when receiving said main power supply voltage.

17. The RFID transponder chip according to claim 11, wherein
a distance between said temperature sensor and said data control circuit is longer than a distance between said temperature sensor and at least one of said memory control circuit and said nonvolatile memory.

18. The RFID transponder chip according to claim 17, wherein
at least one of said memory control circuit and said nonvolatile memory is disposed between said temperature sensor and said data control circuit.

19. The RFID transponder chip according to claim 11, wherein
a distance between said temperature sensor and said power supply control circuit is longer than a distance between said temperature sensor and at least one of said memory control circuit and said nonvolatile memory.

20. The RFID transponder chip according to claim 19, wherein
at least one of said memory control circuit and said nonvolatile memory is disposed between said temperature sensor and said power supply control circuit.

* * * * *